United States Patent [19]

Hafferkamp

[11] 4,290,517
[45] Sep. 22, 1981

[54] METHOD AND APPARATUS FOR REDUCING LOADER BAR IMPACT

[75] Inventor: Harry C. Hafferkamp, Toledo, Ohio
[73] Assignee: Owens-Illinois, Inc., Toledo, Ohio
[21] Appl. No.: 964,330
[22] Filed: Nov. 29, 1978
[51] Int. Cl.³ .......................................... B65G 47/26
[52] U.S. Cl. .................................... 198/427; 198/430
[58] Field of Search .............. 198/427, 430, 436, 487, 198/740; 74/40, 42, 44, 48, 50, 55

[56] References Cited

U.S. PATENT DOCUMENTS 1,595,917  8/1926  Owen ...................................... 74/44
4,067,434  1/1978  Mumford ............................. 198/427

Primary Examiner—Joseph E. Valenza
Assistant Examiner—Douglas D. Watts
Attorney, Agent, or Firm—D. T. Innis; M. E. Click; D. H. Wilson

[57] ABSTRACT

Apparatus for modifying a drive system for a lehr loader in which a rotating cam functions to raise and lower a pusher bar for moving ware from a cross-conveyor onto a lehr belt, with a crank arm being connected to the rotating cam and the pusher bar to effect forward and reverse movement of the loader bar. In this arrangement, the effective length of the crank arm which is moving the loader bar forward and backward in response to rotation of the rotating cam, is changed by having its connection to the rotating cam shiftable in response to the rotational position of the rotating cam. This changing position is accomplished by having the crank connected to the rotating cam through a radially extending slot, with the position of the crank connection in the slot being regulated by a stationary box cam that circumscribes the path of rotation of the rotating cam.

2 Claims, 2 Drawing Figures

METHOD AND APPARATUS FOR REDUCING LOADER BAR IMPACT

BACKGROUND OF THE INVENTION

The conventional lehr loaders, such as that shown in U.S. Pat. No. 3,424,030 issued Jan. 28, 1969 to J. L. Mennitt, which schematically shows the physical arrangement of a lehr loader and a cross-conveyor positioned in front of an annealing lehr, are being required to move greater numbers of articles or glass containers onto a lehr mat during a given time period.

Production of glass containers has increased in recent years such that a forming machine now will produce more than twice the number of bottles per minute as they previously did, this being due to the increase in the number of individual sections which form a complete forming machine of the wellknown Hartford I.S. type and also in the fact that many of these individual sections are capable of producing three containers at a time during each cycle of operation of the section. The loader which loads the ware onto the lehr by pushing a line of ware from a cross-conveyor across a dead plate onto the moving lehr mat has created problems in plant operation because it must move faster and is reaching the limit of its mechanical ability to move ware without tipping the ware over.

Another consideration is that because the cross-conveyor is moving at a greater speed in order to move the larger volume of the ware from the machines to the lehr, the loader, even if it is of the type which is illustrated in U.S. Pat. No. 4,067,434 issued Jan. 10, 1978 to E. H. Mumford, which follows in the direction of the movement of ware on the cross-conveyor at the time it moves across the line of ware, has been taxed almost beyond its mechanical capabilities.

Some lehrs may be as narrow as eight feet, while others, as wide as ten to twelve feet, are capable of receiving thirty containers in a row across the width of the lehr. As would be expected, when moving thirty containers at one time by pushing them from a moving conveyor at right angles to this movement onto a dead plate and then onto the receiving end of a moving lehr belt or mat, considerable force will be required. Movement of a pusher bar of this size and the further requirement that it move also in the direction of movement of the ware has become a major consideration in the production speeds of a glass plant. This movement has to be smooth; otherwise, if there is vibration, there is a tendency for the ware to be tipped. Also in these present lehr loaders there is a tendency, if the loader does not move through the row of ware fast enough, that the first incoming container that will form the next row may be struck by the end of the pusher bar, again tipping over a container. In any of the instances when a container is tipped over, it is likely to be damaged to the extent that it cannot be used and, therefore, becomes a discarded piece of ware that must be remelted.

With the foregoing in view, it is an object of this invention to provide a lehr loader in which the pusher bar may be moved forward at a slower rate to avoid high speed impact with the newly formed ware and to push the ware onto the lehr mat with a more controlled velocity than previously capable of being performed by existing lehr loaders. The timing cycle of the movement of the lehr bar is such that it may move back to its position preparatory to moving a row of ware more rapidly than the previous lehr loaders, thus providing additional time in the cycle for moving the ware from the cross-conveyor without interference and with a smoother, unhurried, movement.

SUMMARY OF THE INVENTION

Apparatus and method for pushing a line of ware onto the infeed end of a lehr from a moving row of ware and in which a motor driven cam which lifts the pusher bar in a predetermined cycle and drives a crank arm for moving the bar forward and backward has the crank arm-operating mechanism comprising an elongated, generally radially extending slot formed in the driven cam with a follower positioned in the elongated slot and with means for controlling the movement of a follower in the slot during the rotation of the driven cam whereby the velocity of movement of the pusher bar and the impact of the bar on the row of ware is controlled.

DETAILED DESCRIPTION OF THE DRAWINGS

Figure 1:
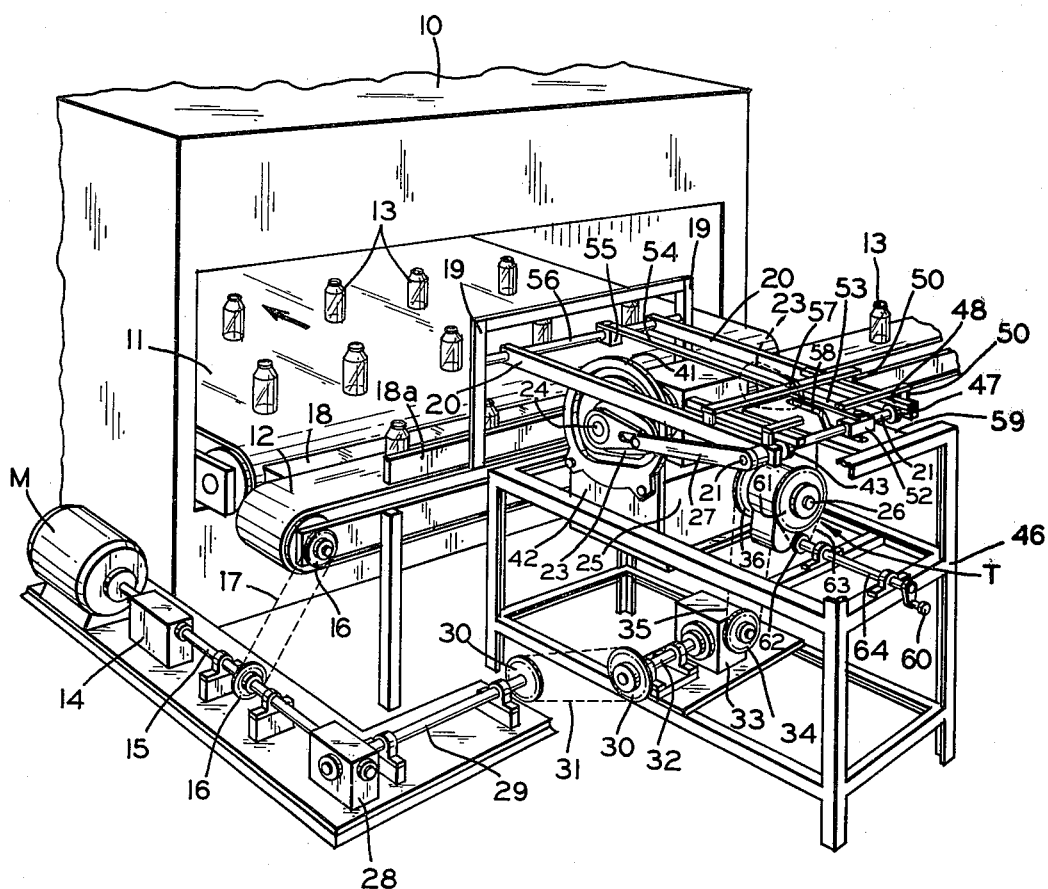
FIG. 1 is a perspective view showing schematically a conventional lehr loader at the hot end of the glassware annealing lehr with the drive system of the invention incorporated therein.

In the illustrated embodiment of FIG. 1, the invention has for its purpose, regulating the time of the initiation of the working stroke of the ware pusher bar in relation to the movement of bottles or the like across the front end of the lehr. Proper timing is essential to ensure against upsetting bottles, as can occur, incident to improper contacting of the bottles with the pusher bar. It should be understood that the system illustrated, is to provide a smoother movement of the pusher bar during its initial contact or impact with the row of ware so as to provide a smooth transfer of the containers to the lehr without excessive initial velocity.

In FIG. 1, the mechanism with which the lehr loader drive system of my invention is illustrated, takes the form of a tunnel-like lehr 10 having a continuously moving lehr mat 11 of conventional form. A horizontal cross-conveyor 12 extends across the front end of the lehr and functions to position bottles 13, one row at a time for pushing onto the lehr conveyor or mat 11. This cross-conveyor 12 is driven by a motor M operating through a speed reducer unit 14, horizontal shaft 15, sprockets 16 and a sprocket chain 17. A dead plate 18 supports bottles upright as they are pushed from the cross-conveyor 12 onto the lehr conveyor 11. One form of lehr loader, to which the present invention is adapted, comprises a horizontal pusher bar 18a suspended by arms 19 from one end of a vertically swingable, generally horizontally slidable supporting frame 20. This frame is pivotally mounted to the axis of a horizontal shaft 21 near its right-hand end, as viewed in FIG. 1, so that its bar-carrying end 22 and the pusher bar 18a may move vertically and clear the developing row of bottles on the incoming cross-conveyor 12, in order to retract to the position shown in FIG. 1.

Both reciprocation and vertical swinging movement of the pusher bar supporting frame are under the control of a pair of cams 23 which are mounted on a horizontal shaft 24 disposed parallel to the pusher bar. This shaft is journaled in a gear unit 25 suitably connected to the driven shaft 26 of a differential timer T. Link or crank arm 27 connect the cams 23 to the pusher bar-carrying frame 20. Power is supplied to the timer T from the aforementioned shaft 15, through a direction change gear unit 28, shaft 29, sprockets 30, sprocket chain 31, a stub-shaft 32 connecting one of the sprockets and a second direction change gear unit 33, the latter having a driven sprocket 34 connected by a sprocket chain 35 to a sprocket 36 which constitutes part of the differential timer.

Figure 2:
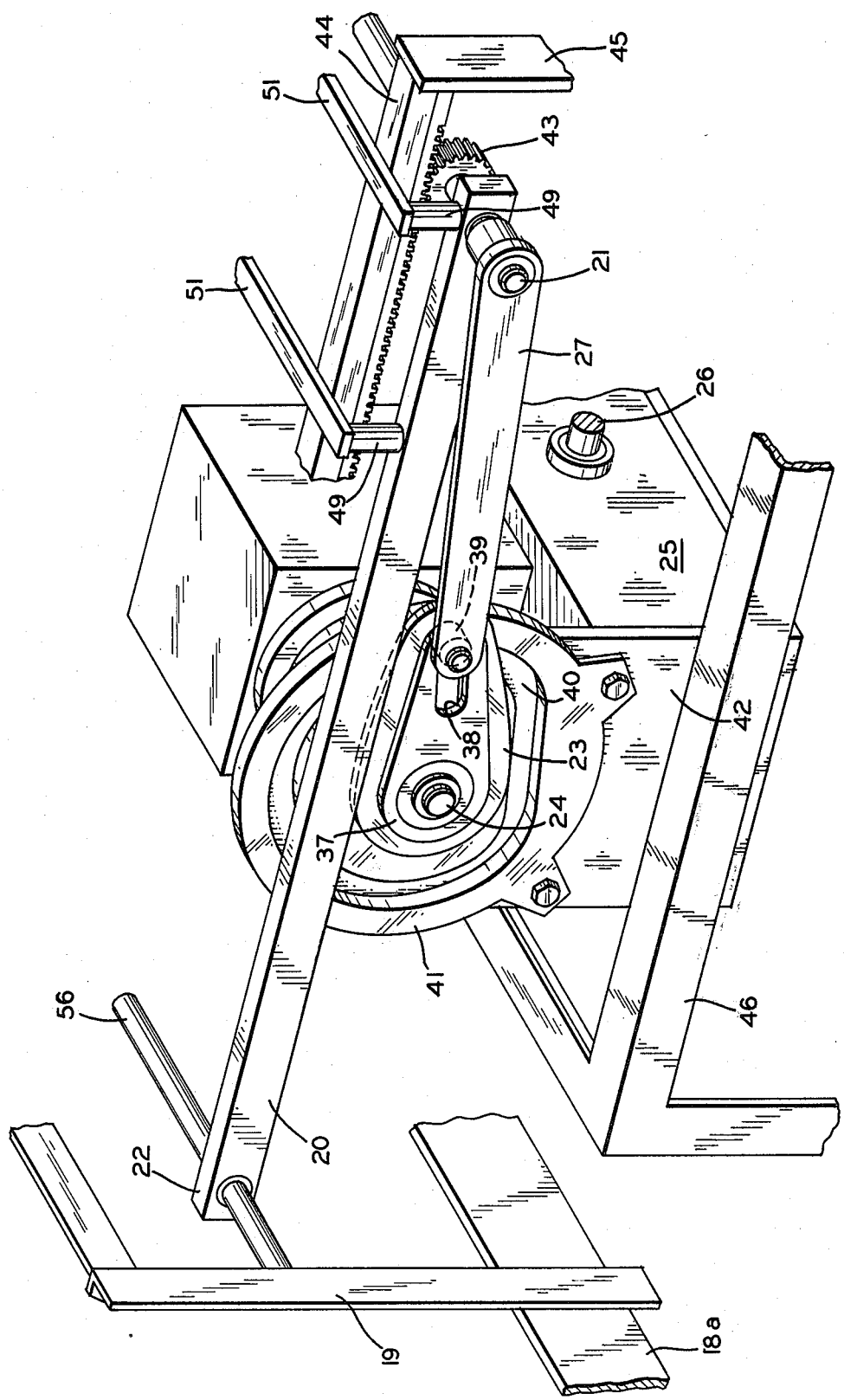
FIG. 2 is a perspective view with parts broken away providing an enlarged view of the drive system of the invention.

As can readily be seen from viewing FIG. 2, the cams 23, of which only one is shown in detail in FIG. 2, are provided with a slot 38 within which a follower 36, carried at one end of the arm 25, is positioned. Overlying the lift cam 23 at the left side thereof, as viewed in FIG. 1 and as shown in large detail in FIG. 2, is a crank 37. The crank 37 is connected to the shaft 24 and extends generally parallel to the direction of the longest radius of the lifting cam 23. The crank is provided with a horizontal slot 38 within which a follower 39 is mounted. A slot, at least as large as that shown with respect to the slot 38, is also provided in the cam 23 so that the follower 39 will extend through both slots and engage within a cam track 40 formed in the face of a vertically positioned cam plate 41.

Cam plate 41, as can be seen in FIG. 2, is bolted to a vertical mounting plate 42 which is carried by the gear unit 25 to which the shaft 26 is connected. The follower 39 will then be rotated about the axis of shaft 24 and at the same time follow the track 40 of the cam plate 41. In this manner the crank arm 27 through the shaft 21 will move the frame 20 in a generally horizontal reciprocating movement. The shaft 21 is free to rotate relative to the frame 20 and, as best shown in FIG. 2, carries a pinion 43 thereon which meshes with a stationary rack 44. The rack 44, which is shown broken away in FIG. 2, is mounted to a mounting arm 45 which is fixed to a frame 46. Frame 46 is comprised of a pair of generally rectangular-shaped frames supported by four legs resting on the floor and serves to provide the mounting for all of the drive mechanism of the lehr loader. The end of the shaft 21, opposite the pinion 43, carries a second pinion 47 which is in mesh with a second stationary rack 48.

Extending vertically upward from the top surface of the frame 20 are a pair of spacer members 49. A similar pair of spacer members 50 extend vertically upward from the right side frame member 20. Each spacer member 49 is connected by a bar 51 to a complementary spacer member 50 at the opposite side of the frame 20.

It should also be pointed out that the shaft 21 extends through the pinion 47 and is pivotally connected to the frame 20 at the right-hand side of the unit, as viewed in FIG. 1.

A block 52, having a horizontal, cylindrical opening through which the shaft 21 extends, is free to move along the length of the shaft 21. The block on its upper surface is pivotally connected to a drive link 53. The drive link 53 extends to the left, as viewed in FIG. 1, and at its forward end 54 is fixed to a block 55. It should be pointed out that the block 55 is fixed to a horizontal shaft 56. The link 53 is pivoted intermediate its length to the forward one of the bars 51 at 57. The shaft 56 is fixed to the arms 19 at opposite ends and actually serves to support the arms 19. The shaft 56 is axially shiftable relative to the frame members 20, it being understood that the frame members 20 functionally raise and lower the pusher bar 18a and move the pusher bar 18a into and out of the direction of the lehr mat movement.

The pusher bar 18a also is moved in a side shift motion to the left at the same time that it is being moved from the position shown in FIG. 1 to the position where it would be extending across the cross-conveyor 12 and positioning the ware on the dead plate 18. Side shifting of the pusher member is accomplished by the pivotal movement of line 53. As previously explained, the right-hand end of the link 53 is mounted to the upper surface of the block 52 which is free to move axially of the shaft 21. The block 52 carries a cam follower which extends vertically downward from its lower surface. This cam follower extends within a cam track 58 formed as a cut-out or slot in a horizontal plate 59. This cam track 58 and plate 59 are similar in configuration and function to the cam plate and follower mechanism shown in U.S. Pat. No. 4,067,434, assigned to the assignee of the present case.

It can readily be seen that upon forward movement of the frame 20, the block 52 will at first move forward in a generally straight line perpendicular to the plane of the pusher bar 18a. Its follower will follow the cam track 58 causing the block 52 to shift relative to the shaft 21 and pivot the link 53 about the point 57. This in turn will side shift the pusher bar 18a. Side shifting of the pusher bar is an advantageous thing from the point of view that as the ware is moving from right to left, as viewed in FIG. 3 on the cross-conveyor 12 when the bar 18a encounters a row of bottles and pushes this row toward the lehr mat 11. Side shifting will occur in the direction of movement of the ware on the cross-conveyor. In this manner, avoidance of hitting the next approaching or lead bottle for the next row of bottles that will accumulate on the cross-conveyor is assured.

By providing a pair of stationary racks 44 and 48 which mesh with a pair of pinions 47 and 43, forward movement of the frame 20 at both sides is assured to be positive and equal. At the same time, the lift cams 23 will be lifting the arms of the frame 20 in the proper, sequence.

It should be understood that the frame 20 by reason of its rear portion which is connected to the shaft 21, moves beneath the stationary racks, will pivot about the axis of the shaft 21 with the shaft 21, however, moving forward as the crank arm 27 is driven by the crank 37.

The position of the connection between the crank arm 27 and the crank 37 is controlled by the contour of the fixed cam 40 and provides a system whereby forward movement of the pusher bar 18a will be carefully controlled so as to minimize impacting the bottles. After initial contact of the bar 18a with the line of ware, the ware will be accelerated at a controlled rate not previously achieved.

In the relative position of the crank 37 and frame 20, as viewed in FIG. 2, with the shaft 24 being driven in a clockwise direction, the configuration of the cam 23 shows that the frame 20 is at its lowest position and will next be moving forward as the cam 23 and the crank 37 rotate, thereby drawing the crank arm 27 forward. After the pusher bar 18a pushes the ware onto the lehr mat, the cam 23 will begin to lift frame 20 upwardly and at the same time the mechanical advantage of the crank arm 27 will be increased as its follower 39 is moved outwardly in the slot 40. This transition is smooth to avoid any vibrations in the pusher mechanism. The follower 39 will continue riding in the track 40 as the pusher bar is moved to its highest position and then drawn back over the row of incoming ware and then be lowered to the position generally illustrated in FIGS. 1 and 2 at which time the frame will again be moved forward at a controlled rate provided by the relative position of the follower 39 and the track 40. During the controlled rate of movement of the frame 20, in a forward direction, the side shifting cam 58 and link 53 will come into play.

From the foregoing, it is apparent that the motor M which operates or drives the cross-conveyor 18 to bring bottles seriatim in front of the lehr entrance, also serves as the drive means which moves the article pusher bar 18a through a closed path to thereby push rows of bottles onto the lehr conveyor 11. When the time of pusher bar advance is slightly off so that proper contact with the bottles is not being affected, it may be necessary to either retard or advance initiation of the working stroke of the bar. This may be accomplished by manually rotating the shaft 26 to either advance or retard the angular position of shaft 24, and this will corresponding alter the position of the cams 21 relative to the drive.

From a reading of U.S. Pat. No. 3,424,030, it will be readily apparent that variations in the timing relationship of cross-conveyor 12 and pusher bar 18a are exclusively affected when sprocket 61 is angularly displaced. Also, the antecedent speed of the shaft and its speed subsequent to the interval of adjustment are identical, whereas during the adjusting interval, the shaft speed is accelerated or decelerated, with respect to the antecedent speed, depending upon the direction of adjustment.

Because it is advantageous to be able to move this timer sprocket 61 from a remote point, or location, a manually rotatable horizontal timer shaft 64, having a small sprocket 62 at one end thereof is connected by a sprocket chain 63 to the timer sprocket 61. The timer shaft 64 at its other end is provided with a hand crank 60 or handle.

I claim:

1. Apparatus for pushing a line of ware onto the infeed end of a lehr from a moving row of ware, in which a pusher bar is carried at the forward end of a generally rectangular frame and the frame is pivotally mounted at the other end, with a pair of motor-driven cams lifting the forward end of the frame in a predetermined cycle and a crank arm driven by the motor and connected to move the frame forward and backward;
    a crank driven by the motor in parallel with one of the lift cams;
    a stationary box cam having a path that circumscribes the axis of rotation of the driven cam and crank;
    an elongated, generally radially extending slot formed in said crank;
    a cam follower positioned in both the elongated slot and in the stationary box cam;
    means pivotally connecting one end of the crank arm to said cam follower:
    a horizontal shaft extending across the width of said frame at the rearward end thereof and rotatable relative thereto;
    means pivotally connecting the crank arm to the shaft on said frame; and
    means drivingly connecting the sides of the frame together, whereby forward and backward movement of said frame is equally transmitted to both sides of said frame.

2. The apparatus of claim 1 wherein said means drivingly connecting the sides of the frame together comprises:
    a pinion mounted adjacent each end of said shaft; and
    a pair of stationary racks in engagement with said pinions.

* * * * *